Figure 1:
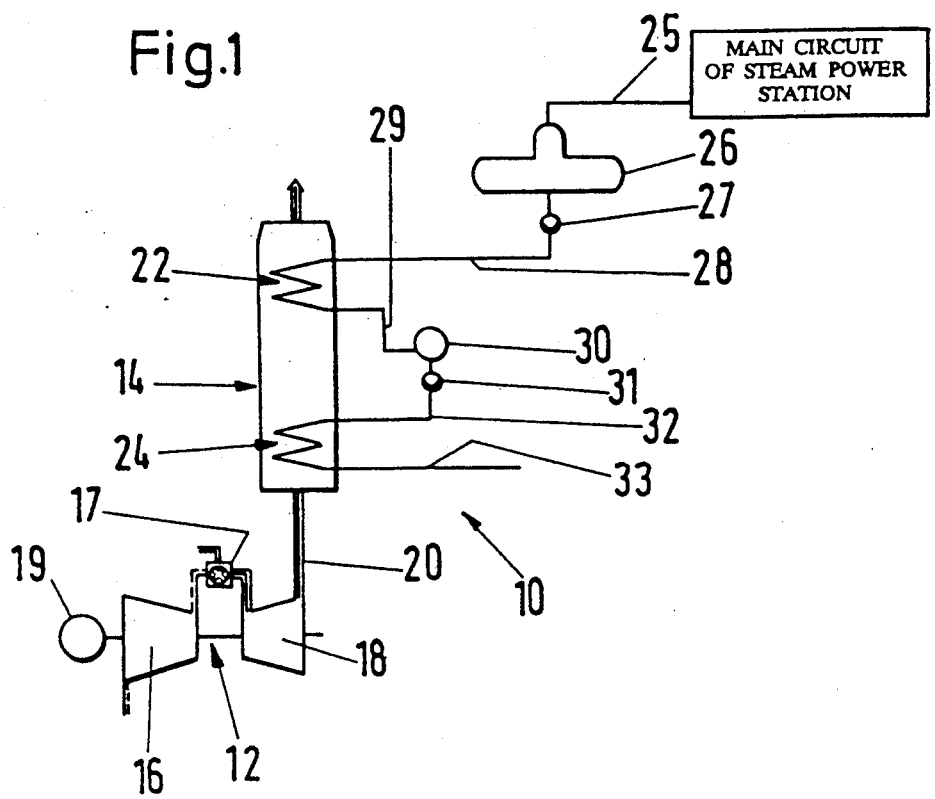

United States Patent [19]

Häuser

[11] Patent Number: 5,029,443
[45] Date of Patent: Jul. 9, 1991

[54] METHOD AND DEVICE FOR THE GENERATION OF STEAM AND POWER FOR THE START-UP AND/OR AUXILIARY OPERATION OF A STEAM POWER STATION

[75] Inventor: Ulrich Häuser, Viernheim, Fed. Rep. of Germany

[73] Assignee: Asea Brown Boveri Aktiengesellschaft, Mannheim, Fed. Rep. of Germany

[21] Appl. No.: 575,404

[22] Filed: Aug. 29, 1990

[30] Foreign Application Priority Data

Aug. 31, 1989 [DE] Fed. Rep. of Germany ....... 3928771

[51] Int. Cl.$^5$ .................. F01K 13/02; F01K 23/06
[52] U.S. Cl. .......................... 60/656; 60/646; 60/676; 60/39.182
[58] Field of Search ............... 60/656, 646, 657, 676, 60/39.182, 652

[56] References Cited

U.S. PATENT DOCUMENTS

| 3,016,712 | 1/1962 | Taylor | 60/676 |
| 3,879,616 | 4/1975 | Baker et al. | 60/39.182 X |
| 3,919,839 | 11/1975 | Aguet | 60/676 X |

Primary Examiner—Allen M. Ostrager
Attorney, Agent, or Firm—Herbert L. Lerner; Laurence A. Greenberg

[57] ABSTRACT

A method and device for generating steam and electric power for the start-up and/or auxiliary operation of a steam power station include at least one start-up gas turbine, a generator driven by the start-up gas turbine for generating power, and a start-up or auxiliary steam generator being fed by condensate from a main circuit of the steam power station. The exhaust or exit gas from the start-up gas turbine is fed to the start-up or auxiliary steam generator and heating of the start-up or auxiliary steam generator is effected by waste heat in the exhaust or exit gas stream from the start-up gas turbine.

12 Claims, 1 Drawing Sheet

METHOD AND DEVICE FOR THE GENERATION OF STEAM AND POWER FOR THE START-UP AND/OR AUXILIARY OPERATION OF A STEAM POWER STATION

The invention relates to a method for the generation of steam and power for the start-up and/or auxiliary operation of a steam power station, having at least one gas turbine, an auxiliary steam generator, and a generator driven by the gas turbine for power generation, and to device for carrying out the method.

The start-up of steam power stations, which are generally provided with steam turbines, is usually carried out through the use of steam that is made available by means of a start-up boiler which is provided especially for such purpose, is referred to as an auxiliary steam generator below and has separate firing.

In such a case, the electric power required during start-up is generated in a power generator which is driven by a gas turbine and, together with the latter, forms a separate unit which is inoperative during normal operation of the power station.

A disadvantage of the generally known circuit configuration of power station components is the fact that the auxiliary steam generator and the gas turbine for operating the auxiliary power generator are each fired separately. That causes additional expense, since each of the two components requires separate supply and control systems in order to ensure trouble-free operation at any time.

The particular disadvantage of such a configuration on one hand, is the fact that during the generation of the auxiliary power, the waste heat released by the gas turbine is released to the environment without being utilized and the environmental climate is impaired thereby and on the other hand, the efficiency of the power station is reduced.

It is accordingly an object of the invention to provide a method and device for the generation of steam and power for the start-up and/or auxiliary operation of a steam power station, which overcome the hereinafore-mentioned disadvantages of the heretofore-known methods and devices of this general type.

With the foregoing and other objects in view there is provided, in accordance with the invention, a method for generating steam and electric power or current for at least one of start-up and auxiliary operation of a steam power station having a main circuit carrying condensate, at least one start-up gas turbine, a generator driven by the start-up gas turbine for generating power, and a start-up or auxiliary steam generator receiving condensate from the main circuit, which comprises feeding an exhaust gas stream from the start-up gas turbine to the start-up or auxiliary steam generator, and heating the start-up or auxiliary steam generator with waste heat in the exhaust gas stream for the generation of steam.

In particular, according to the invention, the steam generated in the auxiliary steam generator by means of the waste heat from the gas turbine is used as start-up steam for putting the steam power station into operation.

In accordance with another mode of the invention, there is provided a method which comprises feeding the waste heat released by the gas turbine to the normal boiler and utilizing it in this way during normal operation in addition to the steam generation, so that the efficiency of the station can be increased in this way and, for example, a possible peak demand can also be covered.

In accordance with a further mode of the invention, there is provided a method which comprises additionally firing the auxiliary steam generator subjected to the waste heat from the gas turbine in order to make available the quantity of steam required for the start-up and/or auxiliary operation. This can be important particularly if the output of the gas turbine required for driving the power generator is comparatively small, so that its exhaust or exit gas heat is not sufficient for generating the required rate of start-up steam.

In accordance with a further mode of the invention, there is provided a method which comprises constructing the auxiliary boiler as a waste heat boiler for the exhaust or exit gas from the gas turbine, so that the required steam temperatures are reached. The auxiliary boiler in this case can be constructed for natural circulation or forced circulation, so that the required steam rate can be made available both as saturated steam and as superheated steam.

In accordance with an added mode of the invention, there is provided a method which comprises superimposing a further heat source upon the exhaust gas stream being fed from the start-up gas turbine for additionally heating the start-up or auxiliary steam generator and generating an increased rate of saturated steam or a required rate of superheated steam.

In accordance with an additional mode of the invention, there is provided a method which comprises preheating the condensate to be vaporized in a preheating stage in the start-up or auxiliary steam generator before vaporizing the condensate, and heating the preheating stage with the exhaust gas stream being fed from the start-up gas turbine.

In accordance with yet another mode of the invention, there is provided a method which comprises initially feeding the preheated condensate to a mixing header and from the mixing header to a saturated steam stage of the start-up or auxiliary steam generator for generating saturated steam, and feeding the saturated steam into the mixing header and from the mixing header into a superheating stage for conversion into superheated steam.

With the objects of the invention in view there is also provided a device for generating steam and electric power for at least one of start-up and auxiliary operation of a steam power station, comprising a start-up or auxiliary steam generator; a generator for power generation; and a gas turbo set having a compressor, a combustion chamber and a gas turbine for driving the generator for power generation; the gas turbine having an exhaust side connected to the start-up or auxiliary steam generator for heating the start-up or auxiliary steam generator with exhaust gas heat of an exhaust gas stream.

In accordance with yet a further feature of the invention, there is provided a further heat source, such as a combustion chamber, superimposed upon the heating of the start-up or auxiliary steam generator by the exhaust gas stream from the gas turbine.

In accordance with a concomitant feature of the invention, there is provided a connection between the exhaust side of the gas turbine and the start-up or auxiliary steam generator, the further heat source being inserted into the connection.

An advantage associated with the method according to the invention and/or the device according to the invention is that the demand for start-up power and start-up steam arising approximately at the same time, can be met in the best possible way from an economical and ecological point of view.

The fuel being employed is utilized better and the investment costs can be considerably reduced due to the simple engineering construction of the auxiliary boiler as a waste heat boiler.

A further advantage is that waste heat boilers of the size that were previously handled can be made available inexpensively from the point of view of construction and structural detail as well as fabrication and assembly.

A further special advantage of the invention is that when additional auxiliary steam is required during normal power station operation, it can be generated by means of the construction according to the invention, with improved utilization of the fuel, i.e. with higher efficiency.

Other features which are considered as characteristic for the invention are set forth in the appended claims.

Although the invention is illustrated and described herein as embodied in a method and device for the generation of steam and power for the start-up and/or auxiliary operation of a steam power station, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 2:
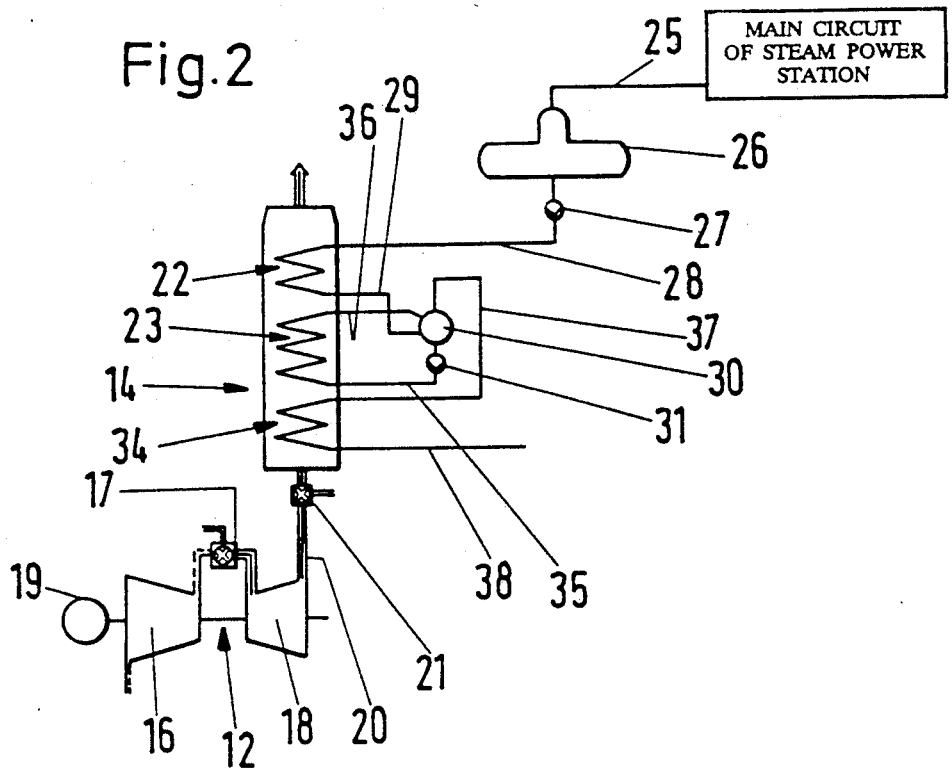

FIG. 1 is a diagrammatic and schematic circuit diagram showing a first embodiment of the device according to the invention with heating being performed exclusively by an exhaust or exit gas stream; and FIG. 2 is a view similar to FIG. 1 of a second embodiment with additional heating.

Referring now to the figures of the drawing in detail and first, particularly, to FIG. 1 thereof, there is seen a start-up and auxiliary system 10 of a steam power station (that is not shown in further detail) which has a gas turbo set 12 and a boiler that is constructed as a start-up or auxiliary steam generator 14 and is connected to the exhaust or exit gas side of the gas turbo set 12. The gas turbo set 12 is formed of a compressor 16, a combustion chamber 17 and a gas turbine 18. The compressor 16 and the gas turbine 18 are joined to one another as well as to a generator 19 for power generation along a single shaft.

The gas turbo set 12 and the generator 19 function in the generally known manner, so that further details regarding these elements are unnecessary.

The exhaust or exit side of the gas turbine 18 is connected by a line 20 to the steam generator 14 and subjects the latter to the waste heat removed from the exhaust or exit gas.

The steam generator 14 has a preheating stage 22 and a vaporization stage 24. In this case, condensate which is preheated in the preheating stage 22 flows from a main circuit (which is not shown in further detail) of the steam power station through a line 25 into a condensate receiver tank 26, from which it passes by means of a condensate pump 27 through a line 28 into the preheating stage 22. After being heated, the condensate flows through a line 29 into a mixing header 30. A feed pump 31, which feeds the preheated condensate through a line 32 to the vaporization stage 24, is provided downstream of the mixing header 30.

The steam generated in the vaporization stage 24 is available in a line 33 for further use in the power station, and especially for start-up.

In a steam power station being formed of a plurality of power station units, it is advantageous to deliver the start-up or auxiliary steam, which is generated in the manner described above, to a so-called auxiliary steam main, from where individual user consumption locations can be supplied.

FIG. 2 shows a circuit diagram for a second embodiment which is largely the same as the first embodiment shown in the circuit diagram of FIG. 1 and only differs with regard to two features. These will be discussed in particular below, whereas the other features that are already known from FIG. 1 are given the same reference numerals.

The essential difference between the embodiments in the two circuit diagrams is that, in the circuit diagram according to FIG. 2, additional heating of the steam generator 14 is provided by a combustion chamber 21 which superimposes a further heat supply upon the exhaust or exit gas flowing in. The combustion chamber 21 is inserted into the connection line 20 between the exhaust or exit side of the gas turbine 18 and the steam generator 14. As a result, the vaporization output of the steam generator 14 is substantially increased, so that it is also possible to achieve higher steam temperatures in addition to an increased steam rate. For this purpose, a vaporization stage 23, which forms a circuit with the mixing header 30, is disposed in the steam generator 14 for the generation of saturated steam.

The preheated condensate flowing into the mixing header 30 is delivered by the feed pump 31 through a line 35 into the vaporization or saturated steam stage 23, where it is vaporized at saturated steam temperature, and flows back through a line 36 into the mixing header 30.

The mixing header 30 is adjoined by a steam line 37 through which the saturated steam passes to a superheating stage 34 in which the saturated steam is superheated. From there, the superheated steam is passed through a steam line 38 to the particular user or consumption locations, corresponding to the line 33 in FIG. 1.

In accordance with the circuit diagrams described above, the method according to the invention makes it possible to carry out the start-up procedure of a steam power station in a particularly economical manner, with a very high degree of efficiency being achievable at a comparatively small energy consumption.

I claim:

1. Method for generating steam and electric power for selectively operating a steam power station in start-up and auxiliary operation, wherein the steam power station has a main circuit carrying condensate, at least one start-up gas turbine, a generator driven by the start-up gas turbine for generating power, and a start-up or auxiliary steam generator receiving condensate from the main circuit, which method comprises feeding an exhaust gas stream from the start-up gas turbine to the start-up or auxiliary steam generator, and heating the start-up or auxiliary steam generator with waste heat in the exhaust gas stream.

2. Method according to claim 1, which comprises superimposing a further heat source upon the exhaust gas stream being fed from the start-up gas turbine for additionally heating the start-up or auxiliary steam generator and generating an increased rate of saturated steam or a required rate of superheated steam.

3. Method according to claim 1, which comprises preheating the condensate to be vaporized in a preheating stage in the start-up or auxiliary steam generator before vaporizing the condensate, and heating the preheating stage with the exhaust gas stream being fed from the start-up gas turbine.

4. Method according to claim 2, which comprises preheating the condensate to be vaporized in a preheating stage in the start-up or auxiliary steam generator before vaporizing the condensate, and heating the preheating stage with the exhaust gas stream being fed from the start-up gas turbine.

5. Method according to claim 3, which comprises initially feeding the preheated condensate to a mixing header and from the mixing header to a saturated steam stage of the start-up or auxiliary steam generator for generating saturated steam, and feeding the saturated steam into the mixing header and from the mixing header into a superheating stage for conversion into superheated steam.

6. Method according to claim 4, which comprises initially feeding the preheated condensate to a mixing header and from the mixing header to a saturated steam stage of the start-up or auxiliary steam generator for generating saturated steam, and feeding the saturated steam into the mixing header and from the mixing header into a superheating stage for conversion into superheated steam.

7. Method for generating steam and electric power for selectively operating a steam power station in start-up and auxiliary operation, wherein the steam power station has at least one start-up gas turbine, a generator driven by the start-up gas turbine for generating power, and a start-up or auxiliary steam generator, which method comprises feeding an exhaust gas stream from the start-up gas turbine to the start-up or auxiliary steam generator, and heating the start-up or auxiliary steam generator with waste heat in the exhaust gas stream.

8. Device for generating steam and electric power for the selective start-up and auxiliary operation of a steam power station, comprising a start-up or auxiliary steam generator; a generator for power generation; and a gas turbo set having a compressor, a combustion chamber and a gas turbine for driving said generator for power generation; said gas turbine having an exhaust side connected to said start-up or auxiliary steam generator for heating said start-up or auxiliary steam generator with exhaust gas heat of an exhaust gas stream.

9. Device according to claim 8, including a further heat source superimposed upon the heating of said start-up or auxiliary steam generator by the exhaust gas stream from said gas turbine.

10. Device according to claim 8, wherein said further heat source is a combustion chamber.

11. Device according to claim 9, including a connection between the exhaust side of said gas turbine and said start-up or auxiliary steam generator, said further heat source being inserted into said connection.

12. Device according to claim 8, wherein the steam power station has a main circuit carrying condensate, and said start-up or auxiliary steam generator receives condensate from the main circuit.

* * * * *